Jan. 10, 1933.  F. E. SLOCOMBE  1,893,658
APPARATUS FOR CUTTING FLAT GLASS
Filed June 7, 1932  2 Sheets-Sheet 1
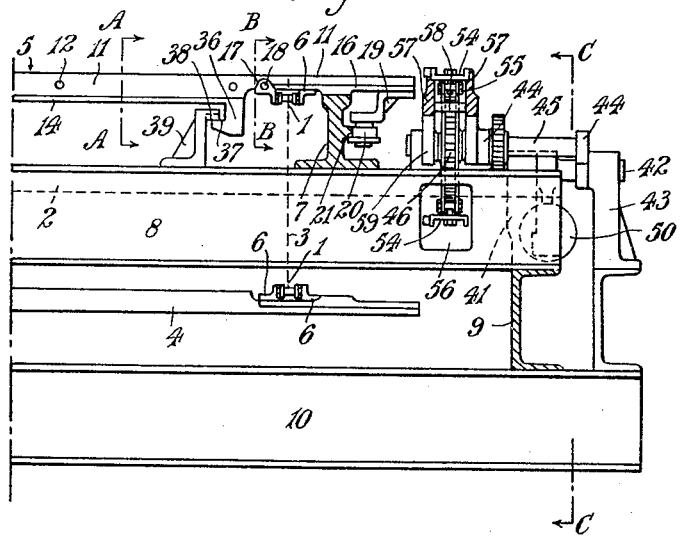
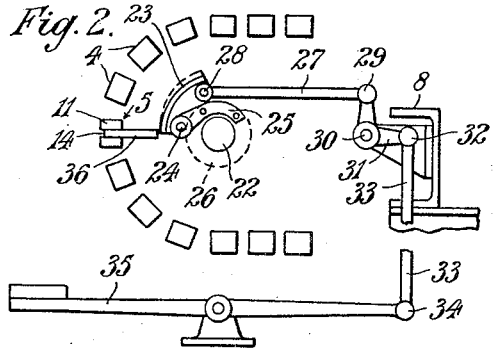
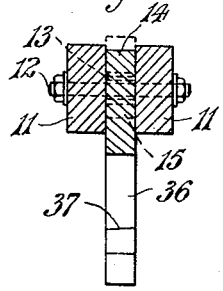
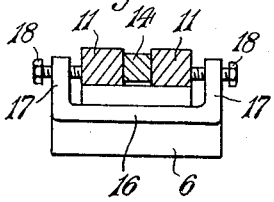
Inventor.
F. E. Slocombe
By Morrison, Kennedy & Campbell
Attys.

Jan. 10, 1933. F. E. SLOCOMBE 1,893,658
APPARATUS FOR CUTTING FLAT GLASS
Filed June 7, 1932 2 Sheets-Sheet 2
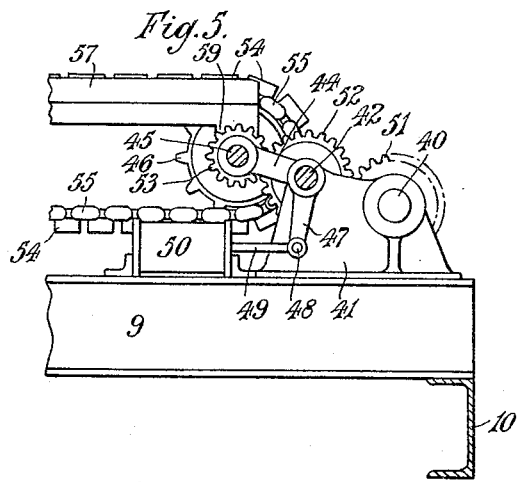
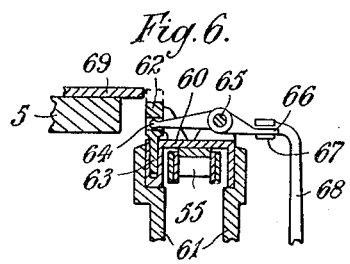
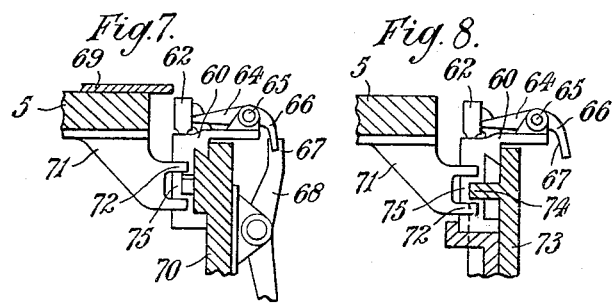
Inventor:
F. E. Slocombe
By Thomson, Kennedy & Campbell
Attys.

Patented Jan. 10, 1933

1,893,658

UNITED STATES PATENT OFFICE

FRANK EDWIN SLOCOMBE, OF KIRK SANDALL, ENGLAND, ASSIGNOR TO PILKINGTON BROTHERS LIMITED, OF LIVERPOOL, ENGLAND

APPARATUS FOR CUTTING FLAT GLASS

Application filed June 7, 1932, Serial No. 615,847, and in Great Britain June 12, 1931.

This invention relates to apparatus for cutting flat glass, in which the glass is laid on a conveyor and carried under the cutting head, and has for its object an improved device for locating the glass on the conveyor and, in some form of conveyor, for retaining it in position against the action of the cutter.

The glass to be cut may already have one cut edge, and it may be desired to make a cut either parallel to or at right angles to this cut edge. In the former case a side fence and in the latter case a cross fence is required, against which the cut edge may be located. Or the glass may have no cut edge and in this case no fence is required, and the presence of any fence would hamper the laying on of the glass.

Stationary side fences have been used, but are rapidly worn by the edges of the glass. Moving side fences, carried by the conveyor, avoid this wear, but, owing to the side play inevitable in a conveyor, are not sufficiently accurate.

According to the invention, the conveyor is provided with a cross fence or a plurality of cross fences and/or a side fence each of which may be moved into and out of operative position. The fences are preferably moved into operative position by automatic means. When a plurality of cross fences are employed, any one may be moved into operative position at the starting end of the conveyor, and it is then restored to inoperative position preferably just before it reaches the cutter. The fences are guided independently of the conveyor, so their rectilinear paths are unaffected by irregularities in the movement of the conveyor. The cross fences are provided with means for adjusting them to a position at right angles to the direction of motion of the conveyor.

The side fence may be formed on an endless chain independent of the conveyor but driven from its driving means at the same speed, and it may be moved into and out of operative position by raising and lowering the endless chain and its chain wheels. Alternatively the endless chain may travel in a fixed position and the side fence may be formed of members movable relatively to the chain, into and out of operative position. In an alternative form of side fence, the side fence members are movable into and out of operative position relatively to blocks adapted to be moved along a fixed guide by the conveyor.

The side fence is preferably moved into operative position by hand operation and restored to inoperative position automatically.

In the following, one constructional form of the invention, with alternative forms for certain parts, will be described, but the invention is not limited to these forms.

In the accompanying drawings:—

Figure 1 is a half transverse section of the conveyor;

Figure 2 is a side view of part of the cross fence operating mechanism;

Figures 3 and 4 are sections at A—A and B—B of Figure 1 respectively, showing the cross fence on an enlarged scale;

Figure 5 is a section at C—C of Figure 1;

Figure 6 is a cross section of an alternative form of side fence device, the section being taken to show the central lever in elevation, and Figures 7 and 8 are cross-sections of another alternative form of side fence device, showing the slats of the fence in elevation.

Referring to the drawings, the conveyor is a slat conveyor of ordinary type, the slats being attached to links of the two conveyor chains, of which one is shown in Figure 1 at 1; the chain wheel at the far end of the conveyor is omitted, but the dotted lines 2 and 3 indicate its centre line and central plane respectively. An ordinary slat 4 is shown on the lower flight of the conveyor and a slat 5 with cross fence is shown on the upper flight.

The slats are supported on the upper flight on the upper surface of guides 7 supported on a series of cross girders 8 and 10, and longitudinal girders 9, which form the framework of the conveyor. The ordinary slats 4 are attached to the chain 1 by brackets 6.

At convenient intervals an ordinary slat is replaced by a slat 5 containing a cross fence. This slat is composed of two side members 11 (Figures 1 and 3) held apart by bolts 12 and distance pieces 13. The fence 14 is adapted to slide vertically between the side members 11 and is provided with slots 15 through which the distance pieces 13 and bolts 12 pass. The fence is shown in its lower position in which it is inoperative; the dotted lines in Figure 3 indicate its operative position. The end portions of the slat are as shown in Figure 4, the side members 11 being reduced in depth and attached to a plate 16 which slides on the guide 7. The plate 16 carries the brackets 6 which are attached to the chain 1, and the left-hand bracket has upstanding lugs 17 carrying set screws 18 bearing against the side members 11. By means of the set screws 18, the whole slat 5 can be adjusted in position so that it is accurately at right angles to the direction of motion of the conveyor. Attached to the plate 16 is a bracket 19, carrying a roller 20 which runs on a guiding surface 21 formed on one side of the guide 7. By this means the slat carrying the cross fence is positively guided independently of the conveyor chain. The brackets 6 are preferably connected to the chain by pins passing through tubular chain pins and having a small end play therein, and in this case the guiding of the slat carrying the cross fence does not entail the guiding of the chain.

The mechanism will now be described whereby any one of the cross fences can be brought into operative position at the starting end of the conveyor and brought out of operative position just before the cutter leaves the glass which is against the fence. Referring to Figure 2, 22 is the shaft of the chain wheels of the conveyor at the starting end. The chain wheel and chain are not shown, but only one of the slats 5 and some of the slats 4 which are attached to the chain links. A circular cam 23 is pivoted at 24 to a bracket 25 attached to the end surface of one of the bearings 26 of the shaft 22. A link 27 is pivoted to the cam 23 at 28 and at 29 to one arm of a lever pivoted at 30 to a bracket 31 on one of the cross girders 8. To the other arm of this lever is pivoted at 32 a link 33 pivoted at 34 to a foot lever 35. By depressing the foot lever, the cam 23 is moved into the position shown by a dotted line. A lug 36 depending from the fence 14 (Figures 1, 2 and 3) passes just clear of the cam 23, which, in its normal position is concentric with the shaft 22, as shown in full lines, but is engaged by it when it is moved by depressing the foot lever 35.

By this engagement the fence 14 is moved outwardly so as to project beyond the side members 11 as shown by the dotted line in Figure 3. When, therefore, the operator desires to lay a piece of glass against a cross fence, he depresses the foot lever and the first cross fence engaging the cam 23 reaches the upper working surface of the conveyor in operative position.

The lug 36 is L-shaped as shown in Figure 1, and its surface 37 engages a cam 38 on a bracket 39 attached to one of the girders 8 below the cutting head, so that the fence is depressed to its inoperative position just before the cutter reaches the fence. The cutter therefore, in falling off the edge of the glass, does not strike the fence and injure itself, and all the cross fences remain in inoperative position except during the travel of glass placed against them up to and under the cutter.

It is to be understood that the mechanisms for raising and lowering the fences are duplicated on the other side of the conveyor.

The side fence will now be described, with reference to Figures 1 and 5. Figure 5 shows a portion of the far end of the conveyor, 40 being the shaft of the conveyor chain wheel, the chain wheel, chain and slats being omitted. The shaft 40 is supported on the bearing block 41, resting on the girder 9, and shown in dotted lines in Figure 1. The same bearing block carries a short shaft 42, supported also by an outer bearing block 43 (Figure 1). Keyed to the shaft 42 are arms 44, carrying the shaft 45 of a chain wheel 46. Also keyed to the shaft 42 is an arm 47 pivoted at 48 to the core 49 of a solenoid 50. This mechanism is duplicated at the starting end of the conveyor. By actuating the two solenoids, the chain wheels 46 are raised into the positions shown in the drawings. When current is cut off from the solenoids, they fall by their weight into a lower position. The circuit of the solenoid may be closed by hand and may be opened either by hand or automatically, as for instance, by the use of a time switch.

The chain wheels 46 are driven from the conveyor shaft 40 at the same peripheral speed as the main conveyor by gear wheels 51, 52 and 53.

The raising and lowering of the chain wheels 46 may be effected by hand levers or any convenient means instead of electrically.

The side fence consists of channel-shaped blocks 54 attached to links of a chain 55 passing round the two chain wheels 46, holes 56 being cut in the girders 8 to give them passage. The blocks 54 are guided between two members 57 running the whole length of the conveyor, and held apart by distance pieces 58. The members 57 are supported on the shafts 45 by depending portions 59 of the members 57, so that the whole system of blocks and guides is supported on the shafts 45 and is raised into the operative position shown in the drawings by the action of the solenoids 50. When in its lower position, the blocks 54 and members 57 are below the level of the slats 5 of the conveyor, so that large pieces of glass can be laid on the conveyor and project beyond its edge. Further, since the side fence system is entirely free of the conveyor, the movement of the side fence is not subject to irregularity from wear of the parts of the conveyor.

Figure 6 shows an alternative form of side fence device, in which only the fence itself moves in and out of operative position. Blocks 60 are attached at convenient intervals to links of the chain 55, and are guided between fixed guides 61. The chain 55 is driven at the same speed as the conveyor. Each block carries a short fence member 62 having a tongue 63 adapted to slide in a slot in one side of the block 60. The fence member 62 is slotted to take the arm 64 of a lever pivoted on the block at 65; the other arm 66 of the lever is adapted to strike a cam 67 on the end of an arm 68 which can be moved in and out of the path of the arm 66. The fence member is shown in its inoperative position below the level of the slat 5 of the conveyor. When it is desired to use the fence the arm 68 which is located at the starting end of the conveyor is moved into the position shown. As each block 60 comes opposite to the arm 68, the arm 66 by striking the cam 67, is depressed, so raising the fence member 62 into the position indicated by dotted line, and as soon as two fence members have been raised, the glass 69 can be laid against the fence so formed. At a point beyond the cutting head, a fixed cam is provided to raise the arm 66 and so return the fence members to their normal inoperative position.

In the form of side fence device shown in Figures 7 and 8, the blocks of the side fence are moved by the conveyor slats, but are guided independently. Parts similar to those of Figure 6 are numbered similarly.

Referring to Figure 7, the block 60 carrying the fence 62 is guided on the member 70 and a bracket 71 on the conveyor slat 5 has two forks 72, embracing the block 60 loosely, one fork at each end of the block. The block 60, therefore partakes of the movement of travel of the conveyor, but is accurately guided by the guide member 70. When the block reaches the end of the conveyor where the conveyor chain passes round its wheel, the guide member 70 is terminated and the block engages a semi-circular plate 73, (Figure 8) having a semi-circular rib 74 which engages an arcual slot 75 in the block. By this means the block is guided round the end of the conveyor in a path corresponding to that of the conveyor slats.

In the following claims when a fence is said to be in inoperative position, it is to be understood that no part of the fence or of its mechanism forms an obstruction to the laying of glass on the conveyor.

Having described my invention I declare that what I claim and desire to secure by Letters Patent is:—

1. In apparatus for cutting flat glass, the combination with a conveyor for the glass and a fence moving with the conveyor, of means whereby the fence may be moved into and out of operative position during the movement of the conveyor.

2. In apparatus for cutting flat glass, the combination with a conveyor for the glass and a fence moving with the conveyor, of hand-operated means for moving the fence into operative position and automatic means for moving it into inoperative position.

3. In apparatus for cutting flat glass, the combination with a conveyor for the glass and a fence moving with the conveyor, of means whereby the fence may be moved into and out of operative position during the movement of the conveyor, and guides for the fence whereby its path is unaffected by irregularities in the movement of the main body of the conveyor.

4. In apparatus for cutting flat glass, the combination with a conveyor for the glass and a fence moving with the conveyor, of hand-operated means for moving the fence into operative position and automatic means for moving it into inoperative position, and guides for the fence whereby its path is unaffected by irregularities in the movement of the main body of the conveyor.

5. In apparatus for cutting flat glass, the combination with a conveyor for the glass and a plurality of cross fences moving with the conveyor normally in inoperative position, of means whereby any one of the fences may be brought into operative position at the starting end of the conveyor, and automatic means for restoring it to inoperative position, just before it reaches the cutter.

6. In apparatus for cutting flat glass the combination with a slat conveyor for the glass of at least one cross fence carried by a conveyor slat in which it is adapted to slide in and out of operative position, means whereby the fence may be moved into and out of operative position during the movement of the conveyor, and guide members constraining the slat to move rectilinearly.

7. In apparatus for cutting flat glass the combination with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, and guide members constraining the slat to move rectilinearly.

8. In apparatus for cutting flat glass the combination with a slat conveyor for the glass of at least one cross fence carried by a conveyor slat in which it is adapted to slide in and out of operative position, means whereby the fence may be moved into and out of operative position during the movement of the conveyor, means for adjusting the position of each slat carrying a cross fence relatively to the conveyor, so that it may be at right angles to the direction of travel of the conveyor, and guide members constraining each such slat to move rectilinearly.

9. In apparatus for cutting flat glass, the combination with a conveyor for the glass of a side fence, means for moving the side fence into and out of operative position during the movement of the conveyor, an endless chain independent of the conveyor carrying said side fence and means for driving said chain at the speed of the conveyor.

10. In apparatus for cutting flat glass, the combination with a conveyor for the glass, an endless chain located at one side of the conveyor, means for driving said chain at the speed of the conveyor, a side fence carried by said chain and means for raising and lowering the endless chain with its chain wheels so as to bring the side fence into operative or inoperative position.

11. In apparatus for cutting flat glass, the combination with a conveyor for the glass, an endless chain located at one side of the conveyor, means for driving said chain at the speed of the conveyor, a side fence constituted by members adapted to be moved relatively to the endless chain so as to bring them into operative or inoperative position, and means for so moving said members during the movement of the chain.

12. In apparatus for cutting flat glass, the combination with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, an endless chain independent of the conveyor located at one side of the conveyor, gearing connected with the driving means of the conveyor adapted to move the chain at the speed of the conveyor, a side fence carried by said chain and means for raising and lowering the endless chain with its chain wheels so as to bring the side fence into operative or inoperative position.

13. In apparatus for cutting flat glass the combination with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, an endless chain independent of the conveyor located at one side of the conveyor, gearing connected with the driving means of the conveyor adapted to move the chain at the speed of the conveyor, a side fence constituted by members adapted to be moved relatively to the endless chain so as to bring them into operative or inoperative position, and means for so moving said members during the movement of the chain.

14. In apparatus for cutting flat glass, the combination with a conveyor for the glass, of a fixed guide parallel with the conveyor at one side thereof, blocks adapted to be moved along said guide by the conveyor, side fence members carried by said blocks and means for moving said members relatively to the blocks so as to bring them into operative or inoperative position.

15. In apparatus for cutting flat glass, the combination with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, a fixed guide parallel with the conveyor at one side thereof, blocks adapted to be moved along said guide by the conveyor, side fence members carried by said blocks and means for moving said members relatively to the blocks so as to bring them into operative or inoperative position.

16. In apparatus for cutting flat glass, the combination with a conveyor for the glass, an endless chain located at one side of the conveyor, means for driving said chain at the speed of the conveyor, a side fence constituted by members adapted to be moved relatively to the endless chain so as to bring them into operative or inoperative position, a cam adapted to be moved by hand into a position in which it operates to raise the side fence members into operative position and a fixed cam adapted to lower them into inoperative position.

17. In apparatus for cutting flat glass, the combination with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, an endless chain independent of the conveyor located at one side of the conveyor, gearing connected with the driving means of the conveyor adapted to move the chain at the speed of the conveyor, a side fence constituted by members adapted to be moved relatively to the endless chain so as to bring them into operative or inoperative position, a cam adapted to be moved by hand into a position in which it operates to raise the side fence members into operative position and a fixed cam adapted to lower them into inoperative position.

18. In apparatus for cutting flat glass, the combination with a conveyor for the glass, of a fixed guide parallel with the conveyor at one side thereof, blocks adapted to be moved along said guide by the conveyor, side fence members carried by said blocks, a cam adapted to be moved by hand into a position in which it operates to raise the side fence members into operative position and a fixed cam adapted to lower them into inoperative position.

19. In apparatus for cutting flat glass, the combiantion with a slat conveyor for the glass of at least one cross fence carried by a conveyor slat in which it is adapted to slide in and out of operative position, means whereby the fence may be moved into operative position at the starting end of the conveyor, automatic means for restoring it to inoperative position just before it reaches the cutter, a fixed guide parallel with the conveyor at one side thereof, blocks adapted to be moved along said guide by the conveyor, side fence members carried by said blocks, a cam adapted to be moved by hand into a position in which it operates to raise the side fence members into operative position and a fixed cam adapted to lower them into inoperative position.

In witness whereof I have affixed my signature hereto.

FRANK EDWIN SLOCOMBE.